(12) United States Patent
Krishnamurthy (10) Patent No.: US 8,572,614 B2
(45) Date of Patent: Oct. 29, 2013

(54) PROCESSING WORKLOADS USING A PROCESSOR HIERARCHY SYSTEM

(75) Inventor: Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/172,963

(22) Filed: Jun. 30, 2011

(65) Prior Publication Data
US 2013/0007762 A1 Jan. 3, 2013

(51) Int. Cl.
*G06F 9/46* (2006.01)
*G06F 15/173* (2006.01)

(52) U.S. Cl.
USPC ........... 718/100; 718/102; 718/104; 718/105; 709/223; 709/224; 709/226

(58) Field of Classification Search
None
See application file for complete search history.

(56) References Cited

U.S. PATENT DOCUMENTS

| | | | |
|---|---|---|---|
| 6,317,778 B1 * | 11/2001 | Dias et al. | 709/214 |
| 7,093,147 B2 | 8/2006 | Farkas et al. | |
| 7,903,571 B1 * | 3/2011 | Herington | 370/252 |
| 2003/0084088 A1 * | 5/2003 | Shaffer | 709/104 |
| 2005/0091654 A1 * | 4/2005 | Lection et al. | 718/100 |
| 2005/0154789 A1 * | 7/2005 | Fellenstein et al. | 709/223 |
| 2007/0002053 A1 | 1/2007 | Hill et al. | |
| 2009/0083390 A1 * | 3/2009 | Abu-Ghazaleh et al. | 709/209 |
| 2009/0187915 A1 * | 7/2009 | Chew et al. | 718/104 |
| 2009/0203409 A1 | 8/2009 | Castor et al. | |
| 2009/0213127 A1 * | 8/2009 | Krishnamurthy et al. | 345/503 |
| 2009/0216883 A1 * | 8/2009 | Fellenstein et al. | 709/224 |
| 2009/0235044 A1 * | 9/2009 | Kisel et al. | 711/173 |
| 2009/0282415 A1 * | 11/2009 | An et al. | 718/104 |
| 2010/0153541 A1 * | 6/2010 | Arimilli et al. | 709/224 |
| 2010/0262975 A1 * | 10/2010 | Reysa et al. | 718/105 |
| 2010/0281483 A1 * | 11/2010 | Rakib et al. | 718/102 |
| 2011/0131580 A1 * | 6/2011 | Krishnamurthy et al. | 718/102 |
| 2011/0225256 A1 * | 9/2011 | Seigneret et al. | 709/207 |

* cited by examiner

*Primary Examiner* — Emerson Puente
*Assistant Examiner* — Charles Swift
(74) *Attorney, Agent, or Firm* — Steven Chiu, Esq.; Kevin P. Radigan, Esq.; Heslin Rothenberg Farley & Mesiti P.C.

(57) ABSTRACT

Workload processing is facilitated by use of a processor hierarchy system. The processor hierarchy system includes a plurality of processor hierarchies, each including one or more processors (e.g., accelerators). Each processor hierarchy has associated therewith a set of characteristics that define the processor hierarchy, and the processors of the hierarchy also have a set of characteristics associated therewith. Workloads are assigned to processors of processor hierarchies depending on characteristics of the workload, characteristics of the processor hierarchies and/or characteristics of the processors.

17 Claims, 8 Drawing Sheets

300 WORKLOAD MAPPING TABLE

| 302 WORKLOAD ID | 304 WORKLOAD TYPE | 306 INITIAL START TIME | 308 CURRENT START TIME | 310 PROFILED EXECUTION TIME | 312 DEADLINE | 314 PROFILED TASK INTEGER THROUGHPUT | 316 PROFILED TASK FLOATING POINT THROUGHPUT | 318 ACC ID | 320 HIERARCHY # |
|---|---|---|---|---|---|---|---|---|---|
| | | | | | | | | | |

FIG. 3A

ACCELERATOR HIERARCHY TABLE 350

| ACCELERATOR ID 352 | ACCELERATOR TYPE 354 | HIERARCHY # 356 | RESPONSE TIME 358 | PEAK INTEGER THROUGHPUT 360 | PEAK FLOATING POINT THROUGHPUT 362 | WORKLOAD ID 364 | TOLERANCE 366 |
|---|---|---|---|---|---|---|---|
| | | | | | | | |

PROCESSING WORKLOADS USING A PROCESSOR HIERARCHY SYSTEM

BACKGROUND

One or more aspects of the present invention relate, in general, to processing within a computing environment, and in particular, to facilitating processing of workloads within the computing environment.

A computing environment may include many types of computing systems, each having its own set of features, capabilities and advantages. As examples, there are general-purpose systems optimized for a broad set of applications or components, and special-purpose systems and/or accelerators optimized for a specific set of applications or components. Each system individually manages its own workload and is separately responsible for performing requested services.

Workloads, such as application programs or application program fragments, are assigned to processors of general-purpose systems, special-purpose systems or to accelerators for processing. Typically, when assigning workloads to accelerators, the assignment is performed in an arbitrary manner without a systematic execution plan.

BRIEF SUMMARY

The shortcomings of the prior art are overcome and additional advantages are provided through the provision of a computer program product for processing workloads within a computing environment. The computer program product comprises a storage medium readable by a processing circuit and storing instructions for execution by the processing circuit for performing a method. The method includes, for instance, selecting a workload to be processed within the computing environment, the workload having one or more workload characteristics associated therewith, and the computing environment including a hierarchy system including a plurality of processor hierarchies, wherein a processor hierarchy of the plurality of processor hierarchies includes one or more processors and has associated therewith one or more characteristics, wherein the one or more characteristics of the processor hierarchy includes at least one characteristic different from one or more characteristics of another processor hierarchy of the plurality of processor hierarchies; and assigning, during runtime, the workload to a processor of a processor hierarchy of the plurality of processor hierarchies, the workload to be executed by the processor, and wherein the assigning is based on at least one workload characteristic of the one or more workload characteristics of the workload to be processed and at least one characteristic of the one or more characteristics of the processor hierarchy with which the processor is associated.

Methods and systems relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, processing of workloads within a computing environment is facilitated. The computing environment includes a processor hierarchy system having a plurality of processor hierarchies that progress outward with respect to the processor cores. Each processor hierarchy includes one or more processors that may include central processing units and/or accelerators, as examples, and each has one or more characteristics associated therewith. At least one characteristic of one processor hierarchy differs from at least one characteristic of another processor hierarchy. For instance, the processor hierarchies that are closest to the processor cores may have lower response times than processor hierarchies that are farthest away from the cores. Moreover, each processor of a processor hierarchy has characteristics associated therewith, and one or more characteristics of one processor may have the same or a different value than one or more characteristics of another processor of the hierarchy. For example, throughput of one processor may be the same or different than the throughput of another processor of the same hierarchy.

Workloads to be processed are assigned to processors based on the needs of the workloads and the characteristics of the processors and/or processor hierarchies. A workload is processed by one or more processors of a particular hierarchy.

In accordance with an aspect of the present invention, a workload may initially be assigned, during runtime, to a processor of one processor hierarchy, but then, may be moved, during runtime, to a processor of another processor hierarchy. Movement is performed, for instance, if processing of the workload will not meet a pre-defined criterion, such as completion within a defined time. In one embodiment, movement from one hierarchy to another hierarchy is outward, in that a workload is moved from a processor hierarchy closer to the processor cores to a processor hierarchy farther away from the processor cores, respectively. Further, it is understood that workloads may be moved to closer hierarchies if deemed appropriate by workload directives.

Figure 1:
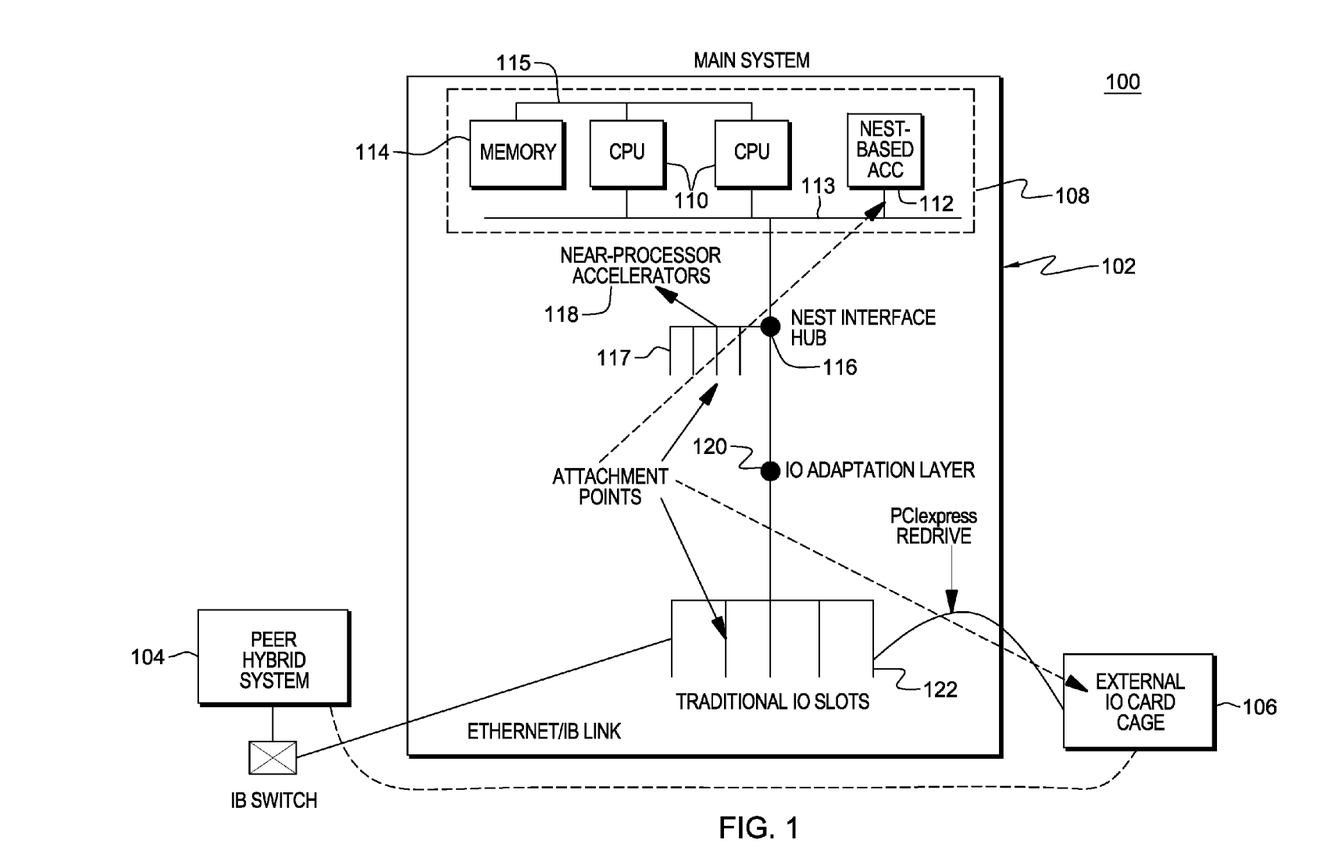
FIG. 1 depicts one example of a computing environment to incorporate and/or use one or more aspects of the present invention.

One embodiment of a computing environment to incorporate and use one or more aspects of the present invention is described with reference to FIG. 1. In one example, a computing environment 100 includes a main system 102 coupled to a peer hybrid system 104 and an external I/O card cage 106. Main system 102 includes, for instance, a processor core 108 including, for instance, a plurality of central processing units (CPUs) 110 coupled to at least one accelerator 112 via one or more buses 113. Central processing units 110 are coupled to main memory 114 via one or more buses 115, and one or more of central processing units 110 may execute an operating system, such as the z/OS® operating system offered by International Business Machines Corporation, Armonk, N.Y. z/OS® is a registered trademark of International Business Machines Corporation, Armonk, N.Y. Other names used herein may be registered trademarks, trademarks or product names of International Business Machines Corporation or other companies.

Accelerator(s) 112 may include, for instance, the Smart Analytics Optimizer, a FPGA (Field Programmable Gate Array), a Cell BE (Broadband Engine), a GPU (Graphical Processing Unit) or DataPower® appliance offered by International Business Machines Corporation, Armonk, N.Y. Accelerators 112 are referred to herein as nest-based accelerators due to their proximity to the central processing units. DataPower® is a registered trademark of International Business Machines Corporation, Armonk, N.Y.

Processor core 108 is coupled to a nest interface hub (a.k.a., I/O hub) 116, which includes, for instance, a bus attached with slots 117 for other accelerators 118. These other accelerators are referred to herein as near processor accelerators, since they are outside, but still in close proximity to, processor core 108.

Further, coupled to nest interface hub 116 is an I/O adaptation layer 120, which is the beginning of the I/O subsystem. It is responsible for converting requests from an I/O protocol of the I/O subsystem to the native processor protocols of the processors. In this particular example, the I/O protocol is the PCIe (PCI Express) protocol.

Coupled to the I/O adaptation layer are the traditional I/O slots 122 that provide input/output processing. These slots include, for instance, inboard accelerators, as well as connections to outboard accelerators. One or more of these slots is coupled to external I/O card cage 106 (e.g., outboard accelerator), via, for instance, PCIe; and/or to peer hybrid system 104 via, for instance, an Ethernet/Infiniband link. Further, the peer hybrid system may also be coupled directly to the external I/O card cage.

Peer hybrid system 104 may include one or more central processing units, one or more accelerators, and/or one or more blade extensions. In one particular example, peer hybrid system 104 is the blade center component of a zEnterprise™ system offered by International Business Machines Corporation, Armonk, N.Y.

In one embodiment, at least a portion of the processors of the main system are segmented into processor hierarchies of a processor hierarchy system. In this particular example, it is the accelerators that are so segmented; however, in another example, the central processing units or other types of processors may also be segmented.

Figure 2:
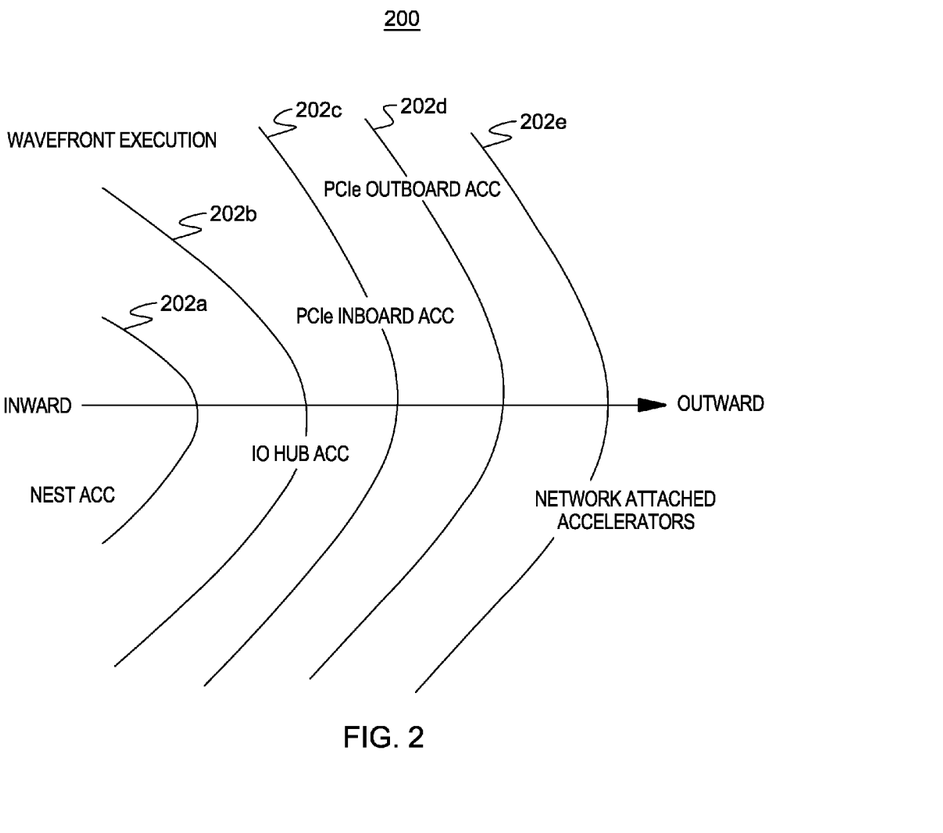
FIG. 2 depicts one example of a processor hierarchy system providing wavefront execution for workloads, in accordance with an aspect of the present invention.

One example of a processor hierarchy system is depicted in FIG. 2. As shown, a processor hierarchy system 200 includes a plurality of processor hierarchies 202a-202e, and each has its relative position with respect to the processor core. For instance, processor hierarchy 202a includes the nest-based accelerators that are within the processor core, and therefore, this processor hierarchy is the closest or the most inward with respect to the processor core. Progressing outward, the next processor hierarchy 202b (i.e., the next wave of processors) includes the near processor accelerators (a.k.a., the I/O hub accelerators). Thereafter, still progressing outward, processor hierarchy 202c includes the inboard accelerators (e.g., PCIe inboard accelerators), then processor hierarchy 202d includes the outboard accelerators (e.g., PCIe outboard accelerators), and finally, processor hierarchy 202e includes the network attached accelerators, which in this example are considered the farthest from the processor core (i.e., the most outward). In other examples, more or less processor hierarchies may be included in a processor hierarchy system. Further, each processor hierarchy may include different accelerators and/or other processors. Those described herein are just examples.

Each processor hierarchy has certain characteristics associated therewith, including, for example, distance from the processor core and performance characteristics, such as response time. In one example, response time increases in processor hierarchies when moving outward within the processor hierarchy system. Further, processors within a given processor hierarchy also have characteristics associated therewith, such as performance characteristics, like response times and throughput values. In other examples, other types of performance characteristics and/or other characteristics may be associated with the processor hierarchies and/or processors.

Workloads also have one or more characteristics associated therewith, including, for instance, workload type and performance characteristics, such as required response time and operation throughput needs. In other examples, other performance characteristics and/or other characteristics may be associated with a workload.

In accordance with an aspect of the present invention, a particular workload (e.g., an application or an application fragment, etc.) is assigned to a selected processor of a particular processor hierarchy depending on the characteristics of the workload and the characteristics of the processor hierarchy and/or processor. In such a scenario, the workload may be initiated on a processor in a particular processor hierarchy, however, if it is determined that the workload will not meet a pre-defined criterion, such as completion in a prescribed time, then the workload is moved to a processor of another processor hierarchy in the outward direction. It may be moved to the next processor hierarchy or to one further in the outward direction, depending on needs.

To assign a workload to a processor of a processor hierarchy and/or to move a workload from a processor of one processor hierarchy to a processor of another processor hierarchy, two data structures are used, in one example. These data structures include, for instance, a workload mapping table and a processor hierarchy table. In the particular example herein, the workloads are being assigned to accelerators, and therefore, the processor hierarchy table is referred to herein as an accelerator hierarchy table. However, other hierarchy tables may be used in other embodiments.

Figure 3A:
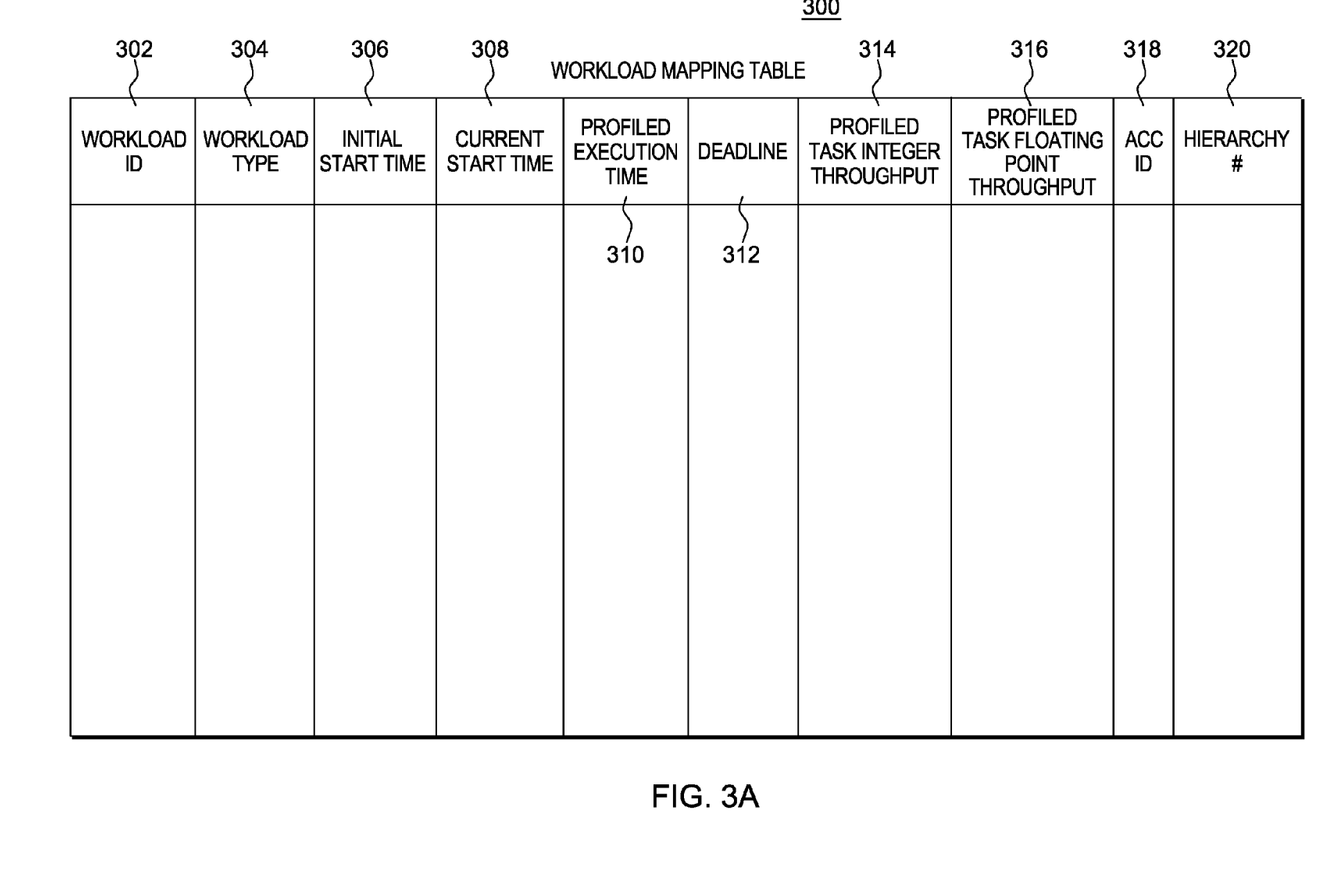
FIG. 3A depicts one example of a workload mapping table used in accordance with an aspect of the present invention.

An example of a workload mapping table is described with reference to FIG. 3A, and an example of an accelerator hierarchy table is described with reference to FIG. 3B. Referring initially to FIG. 3A, in one example, a workload mapping table 300 includes a plurality of fields, such as, workload id 302 identifying the workload to be processed; workload type 304 specifying the type of workload (e.g., known constant execution time, bounded execution time, unknown running time); an initial start time 306 indicating when the workload identified by the workload id is scheduled to begin executing (this is a static value); a current start time 308 specifying the time the workload began executing; a profiled execution time 310 (value, upper, lower—described below) indicating an amount of time it should take to execute the workload (based on profiling); a deadline 312 indicating when execution should terminate; a profiled task integer throughput 314 specifying, based on profiling, the throughput for integer operations of this type of workload; a profiled task floating point throughput 316 specifying, based on profiling, the desired throughput for floating point operations of this type of workload; an accelerator id 318 indicating the accelerator currently assigned to the workload; and a hierarchy number 320 specifying the hierarchy that includes the accelerator that is assigned to the workload.

When an entry is added to the workload mapping table that has a bounded execution time, upper and lower profiled execution member values are recorded in the profiled execution time, along with the value, which is (upper+lower)/2, in one example. For the other workload types, only a value is recorded, which is the profiled execution time.

Figure 3B:
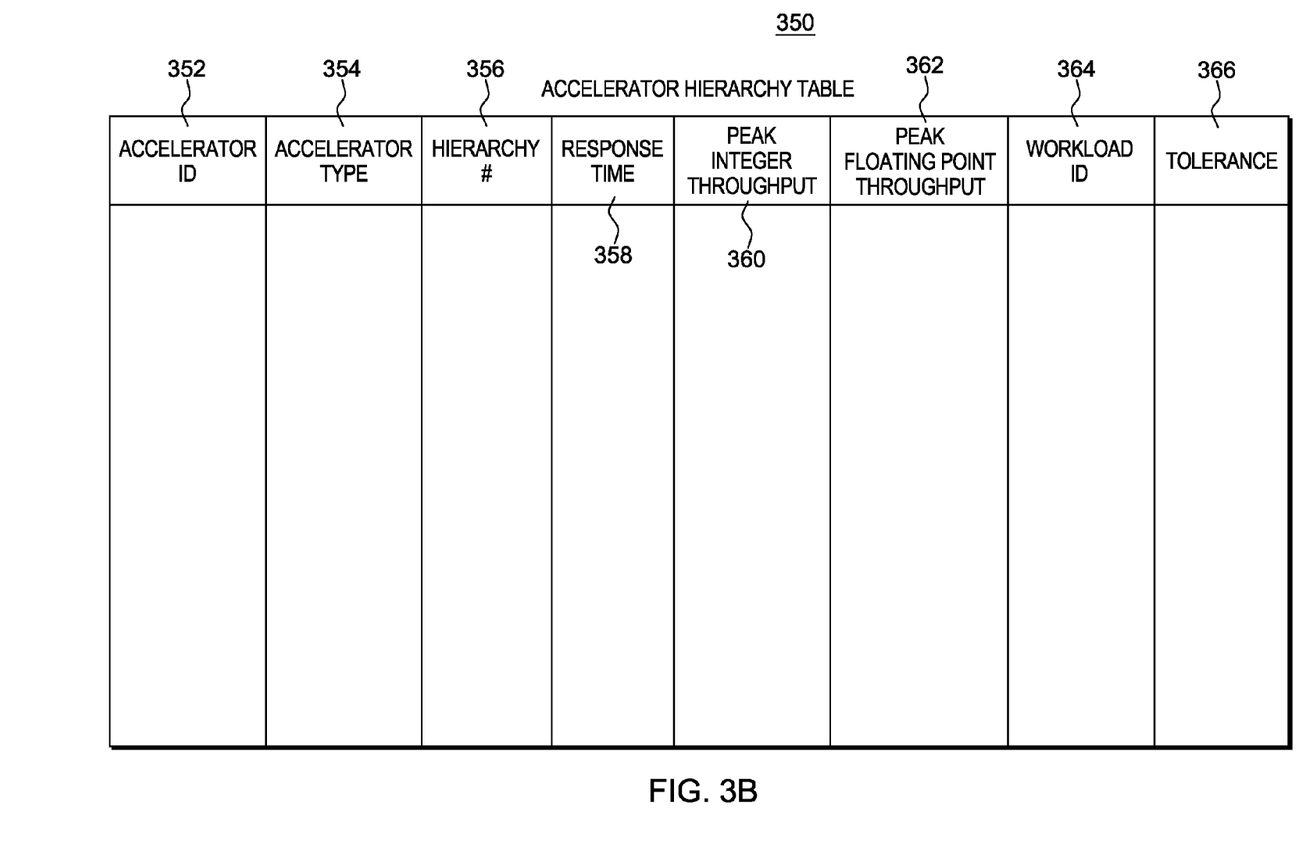
FIG. 3B depicts one embodiment of an accelerator hierarchy table used in accordance with an aspect of the present invention.

Referring to FIG. 3B, accelerator hierarchy table 350 includes a plurality of fields, including, for instance, an accelerator id 352 identifying a particular accelerator; an accelerator type 354 indicating the type of the accelerator identified by the accelerator id; a hierarchy number 356 indicating the processor hierarchy that includes this accelerator; a response time 358 specifying expected response times for this accelerator; peak integer throughput 360 indicating peak throughput for integer operations for this accelerator; peak floating point throughput 362 indicating peak throughput for floating point operations for this accelerator; a workload id 364 specifying a particular workload assigned to this accelerator; and a tolerance 366 indicating an amount of time past completion time that the workload can tolerate before having to be moved. Although various fields are described herein with reference to the accelerator hierarchy table and the workload mapping table, each table may have more, less and/or different fields than described herein. Further, data structures other than tables may be used. Yet further, the accelerator hierarchy table may be a processor hierarchy table that includes processors in addition to and/or instead of accelerators.

In one embodiment, the workload mapping table and the accelerator hierarchy table are used in assigning a workload to a processor within a processor hierarchy. One embodiment of the logic to perform the assigning is described with reference to FIGS. 4A-4B. In one example, this logic is executed within one of the processors (e.g., central processing units) of the processor core. However, in other examples, this logic may be executed by one or more other processors. In this example, the selected processor is an accelerator; however, in other embodiments, the selected processor is other than an accelerator.

Figure 4A:
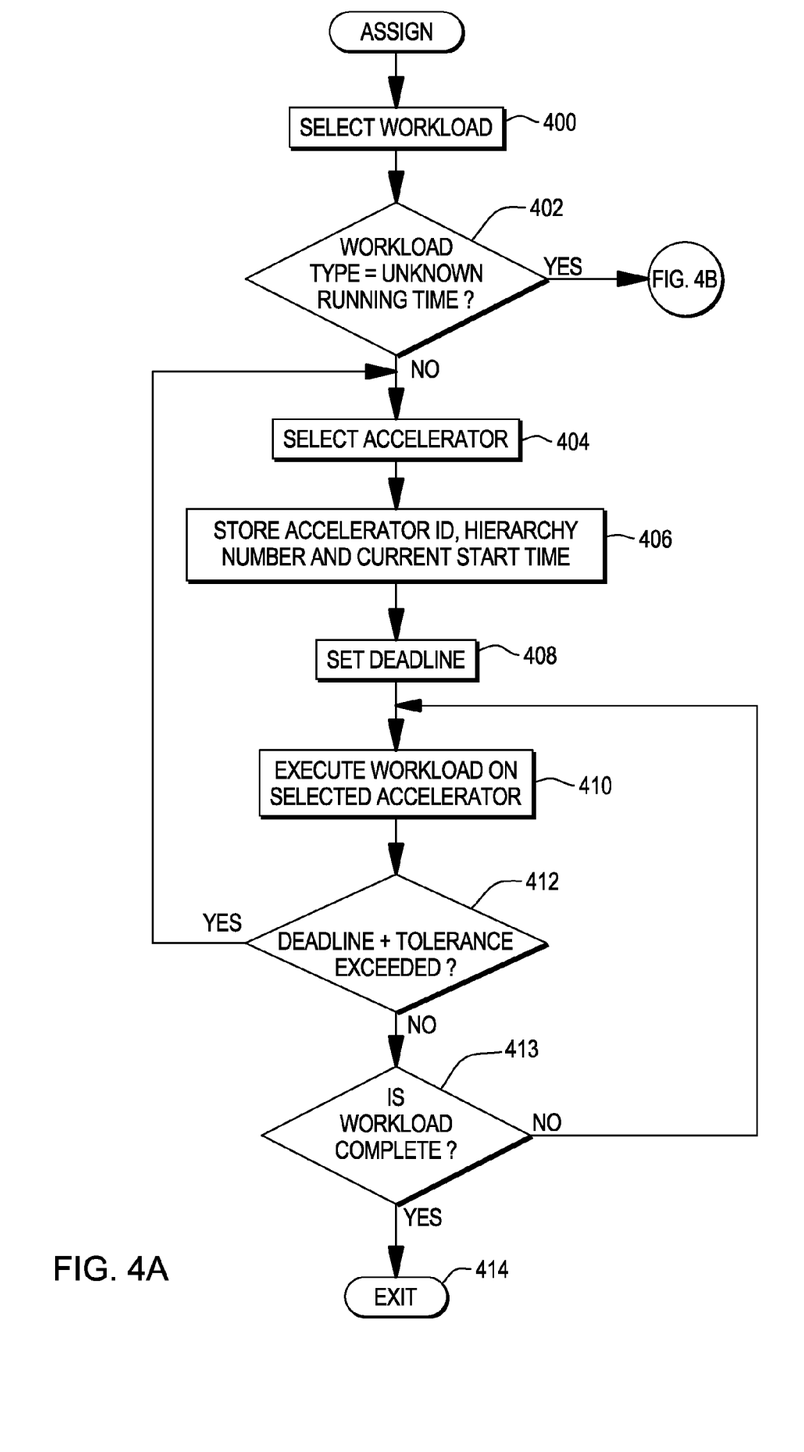
FIGS. 4A-4B depict one embodiment of the logic to assign a workload to a processor of a processor hierarchy system, in accordance with an aspect of the present invention.

Referring to FIG. 4A, initially a workload is selected, STEP 400. In this example, the workload with the lowest initial start time (306, FIG. 3A) is selected. Then, a determination is made as to whether the workload type for the selected workload (304 of FIG. 3A) is an unknown running time, INQUIRY 402. If the workload type is not the unknown running time type, but instead, known constant or bounded execution time, then an accelerator is chosen to process the selected workload, STEP 404. In one example, the accelerator hierarchy table is examined for an accelerator that has a response time (e.g., profiled execution time) and throughput that most closely matches that of the selected workload (obtained from consulting the workload mapping table). An accelerator that most closely matches is selected to execute the workload, and the workload id is placed in the accelerator hierarchy table.

Thereafter, the accelerator id (318, FIG. 3A), the hierarchy number (320, FIG. 3A) of the selected accelerator, and the current start time (308, FIG. 3A) of the workload are stored in the workload mapping table, STEP 406. Additionally, a deadline is set that indicates when this particular workload is to be complete, STEP 408. For instance, the deadline is set equal to the current start time (308, FIG. 3A) plus a profiled execution time (value member of 310, FIG. 3A), and that value is stored in the deadline field (312, FIG. 3A).

The workload then begins executing on the selected accelerator, STEP 410. A determination is made as to whether the deadline (312, FIG. 3A) plus a defined tolerance (366, FIG. 3B) has been exceeded, INQUIRY 412. If not, then a further check is made as to whether the workload is complete, INQUIRY 413. If the workload is complete, then the assigning process terminates, STEP 414. Otherwise, processing continues to STEP 410.

If, however, the deadline plus tolerance has been exceeded, INQUIRY 412, and the workload is not complete, then processing continues with STEP 404, in which another accelerator is selected. In this example, the other accelerator will be in another processor hierarchy. In one particular example, the accelerator selected is one that is in another processor hierarchy and that closely matches the workload throughput, as indicated by comparing fields 314, 316 of FIG. 3A with 360, 362 of FIG. 3B.

Responsive to selecting another accelerator to continue processing the workload, the accelerator id, hierarchy number and current start time of the workload mapping table are updated, STEP 406. Moreover, the deadline is set, as described above, STEP 408 and that value is stored in the workload mapping table. Also, the workload id is stored in the accelerator hierarchy table in the entry corresponding to the newly selected accelerator, and it may be removed from the accelerator entry that previously executed the workload. Then, the workload begins executing on the selected accelerator, STEP 410. In this instance, since the workload was initially assigned to another accelerator, the workload is moved from the previously assigned accelerator to the newly assigned accelerator. In one example, this includes removing the workload (e.g., a pointer to the workload) from a queue associated with the previous accelerator and placing it on a queue associated with the new accelerator, as well as providing an indication of where to start execution. In a further example, a checkpoint is taken of the workload executing on the previously assigned accelerator to save the state (e.g., data) of the workload, and then subsequent to moving the workload to the newly assigned processor, the state is recovered from the checkpointed state.

In one example, for throughput computing workloads, where each computation iteration is essentially stateless, moving a workload in the middle of a computation iteration is possible. In this case, the workload is moved to the new accelerator and the iteration is restarted from scratch. The workload mapping table may also carry a priority flag (low, medium and high values). If the deadline+tolerance is exceeded during execution, the workload assignment process may assign workloads to inner hierarchies (relative to the current hierarchy), if the priority flag of the current running workload being re-assigned is higher than the priority of a new workload waiting to be assigned that has similar throughput and response time needs.

Returning to INQUIRY 402, if the workload type is equal to an unknown running time, then processing continues with INQUIRY 450 (FIG. 4B), in which a determination is made as to whether the workload throughput is known. If the workload throughput is known, then, in one example, the workload is placed on an accelerator with the closest throughput match in the outermost hierarchy, STEP 452. Moreover, the workload id is placed in the accelerator hierarchy table, and the workload mapping table is updated with the accelerator id, hierarchy number and current start time. This accelerator executes the workload, and the execution time and throughput for the workload are profiled, STEP 454. Then, the workload mapping table is updated with these values so that it is no longer an unknown running time, STEP 456.

Figure 4B:
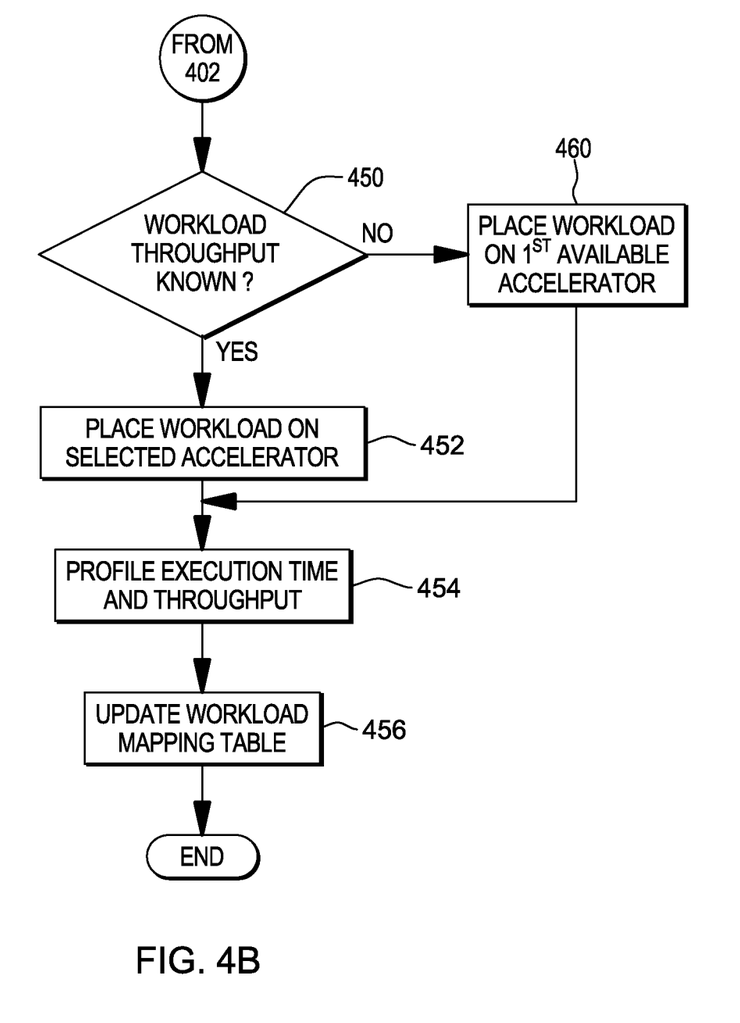

However, if the workload throughput is not known, INQUIRY 450, then, in one example, the workload is placed on a first available accelerator in the outermost hierarchy, STEP 460, and processing continues with executing the workload, profiling the execution time and throughput, STEP 454, and updating the workload mapping table. This completes the assignment processing.

In a further aspect of the present invention, the peer system is provided access to the hierarchy system. In one embodiment, the peer system uses a surrogate process executing on the main system (e.g., on one of the CPUs) and a protocol tunnel to access the hierarchy system. The protocol tunnel is, for instance, between the peer system and the main system and allows commands and workloads to be exchanged. The peer system provides commands and workloads to the surrogate process on the main system via the protocol tunnel. The surrogate process (or address space) issues workloads to the accelerator hierarchy on behalf of the peer system.

Figure 5:
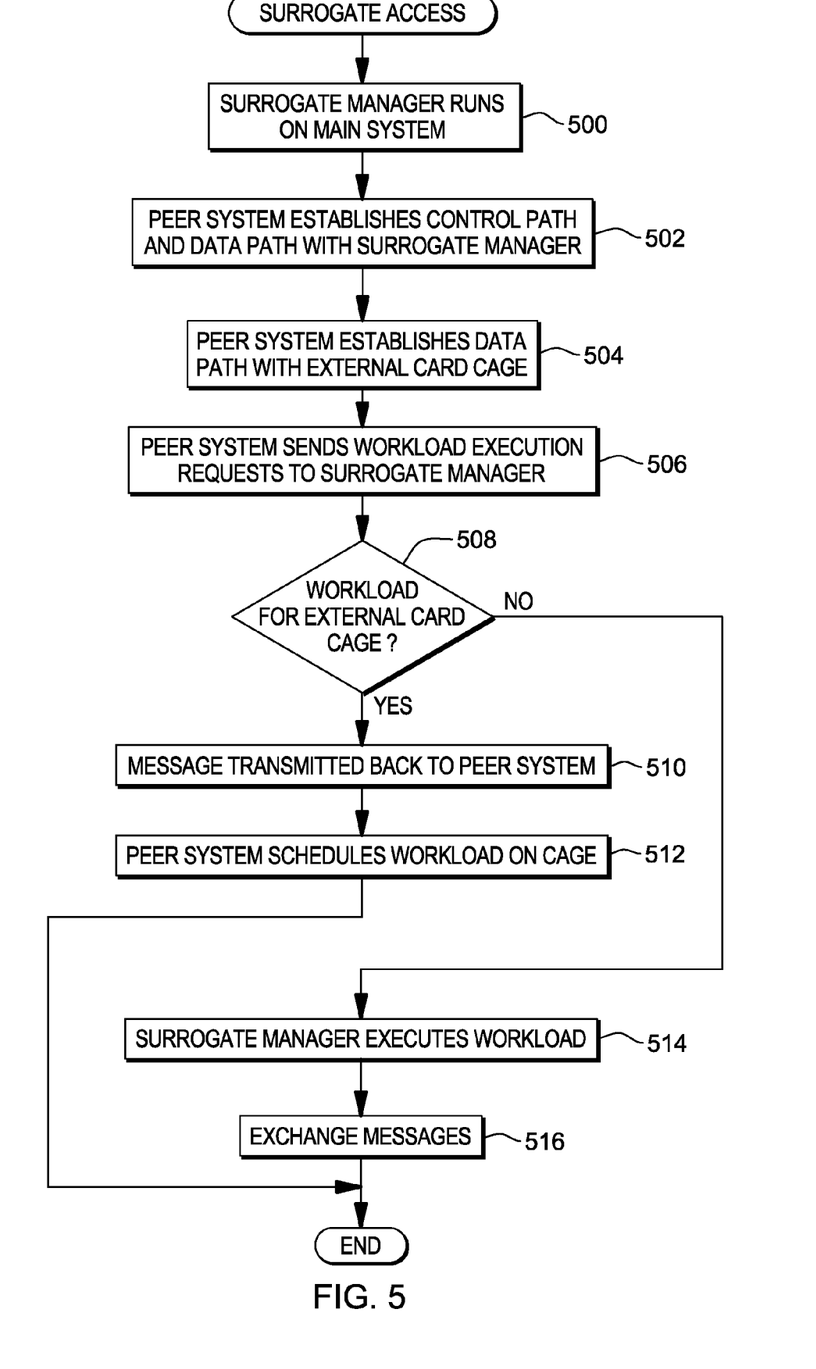
FIG. 5 depicts one embodiment of the logic associated with providing surrogate access to a processor hierarchy system, in accordance with an aspect of the present invention.

One embodiment of the logic to provide surrogate access for a peer system is described with reference to FIG. 5. Initially, a surrogate manager (e.g., a process) runs on the main system in, for instance, a special partition of one of the central processing units, STEP 500. The peer system establishes a control path and a data path with the surrogate manager, STEP 502. For example, the peer system reserves one or more buffers and bandwidth on the link coupling the peer system and surrogate manager for the purposes of transferring data. This is termed the data path. Any control or signaling commands may be transferred between the peer system and main system using a control path. Bandwidth and buffers may also be reserved between the peer system and main system to establish the control path. Bandwidth reservation for control path and data path may be completed on the same physical link or separate physical links may be used for the control and data path, respectively.

Additionally, the peer system establishes a data path with the external card cage, STEP 504. Again, one or more buffers and bandwidth on the link are reserved. The ability of the card cage to accept workloads from two different systems is termed multi-porting. Multi-porting allows enhanced utilization for the card cage as "unknown running time" workloads from the main system may be scheduled on the card cage along with workloads directly from the peer system.

Thereafter, the peer system sends a workload execution request to the surrogate manager, STEP 506. A determination is made by the surrogate manager as to whether the workload is for the external card cage, INQUIRY 508. This determination is made by information in the request, which may be sent along the control path. If the request is for the external card cage, then a message is transmitted back to the peer system over the control path indicating the request is for the external card cage, STEP 510, and the peer system directly schedules the workload on the external card cage via the data path, STEP 512. Processing is then complete.

Alternatively, the peer system may schedule a workload on the card cage and inform the surrogate manager on the main system of the card number where the workload was scheduled. Additionally, the main system may inform the peer system of the card numbers in the external card cage where workloads are scheduled. This helps synchronization and load balancing as the main system and peer system may choose to schedule workloads separately on different cards to avoid contention. An external card cage workload scheduler may also be used. This is a central process that may run on the main system, peer system or other system. Any requests for external card cage compute resources are made through the card cage workload scheduler. The card cage workload scheduler may be used by the main system or the peer system. Using a central entity avoids communication of card numbers where workloads are scheduled, between the main system and peer system.

Returning to INQUIRY 508, if the workload is not for the external card cage, then the surrogate manager executes the workload on behalf of the peer system, including, for instance, assigning the workload to a processor of a hierarchy, as described herein, STEP 514. For instance, the peer system may provide a workload ID to the main system. The main system may use the workload ID and query a workload locator process to obtain a storage location where the workload resides. The main system maintains a workload dispatch table that stores the peer system workload ID, storage location, main system workload ID and workload I/O descriptor. The main system may generate its own workload ID for the purposes of processing and stores this in the main system workload ID corresponding to the peer system workload ID. Workload I/O descriptor may either be "real-time" or "offline". For "real-time" workload I/O, the main system and peer system establish a path where program outputs are written to console screens on the peer system. With "offline" workload I/O, program outputs are sent to the peer system after workload execution is complete on the main system. The surrogate manager follows steps outlined in FIG. 4A and FIG. 4B after the main system workload ID is generated. After workload completes, if workload I/O is selected as "real-time", any output connections to the peer system console is closed. If workload I/O is selected as "offline", any program outputs or addresses of the output files on storage devices are communicated to the peer system. After the main system transfers program outputs back to the peer system, the peer system may acknowledge receipt of these files and the corresponding entry in the workload dispatch table is removed by the main system.

Any error, control and/or synchronization messages are exchanged between the surrogate manager and the peer system using the control path, STEP 516. During execution of a workload any runtime messages and trace outputs are sent by the surrogate manager back to the peer system along the control path. Workload binaries, input and output data are sent using the data path. This completes the surrogate access processing.

Described in detail above is a capability for facilitating workload processing by employing a hierarchy system that provides wavefront execution of workloads. In one aspect, accelerator utilization is increased for main systems (e.g., servers) with a large accelerator footprint. Further, in another aspect, a peer system is able to access an accelerator cluster by using surrogate access.

As one example, workloads/data are assigned, during runtime, to a processor in a processor hierarchy based on response-time, throughput requirements and workload classification. In one particular example, for workloads with known constant execution time, the workloads are ordered by response time and operation throughput needs. Workloads with lowest response time needs are placed on processors closest to the CPU cores that can provide requested operation throughput. The placement progresses from inner processors to outer processors so that workloads can be placed to satisfy responses time and operation throughput needs. In a further example, for workloads with unknown long running execution time, the workloads are placed in the outermost hierarchy so that their mapping does not affect the mapping of any other workload. In yet another example, for workloads with bounded (upper and lower bounds) execution times, the workloads are mapped to a processor hierarchy corresponding to the mid-point of the execution time (these workloads have a range of execution times as indicated by the upper and lower bounds). If the execution time exceeds the response time deadline of a given hierarchy, then it is pushed forward to the next outer hierarchy, and so on. In certain instances, workloads may be run in inner hierarchies to quickly complete execution as determined by workload priority levels. The process continues until the workload is complete. In certain exceptions, execution of the workload may complete in the current hierarchy violating the start time of a new task. Such violations are recorded.

Incomplete processing of a workload is pushed out to an outer processor hierarchy to accommodate variable data processing needs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
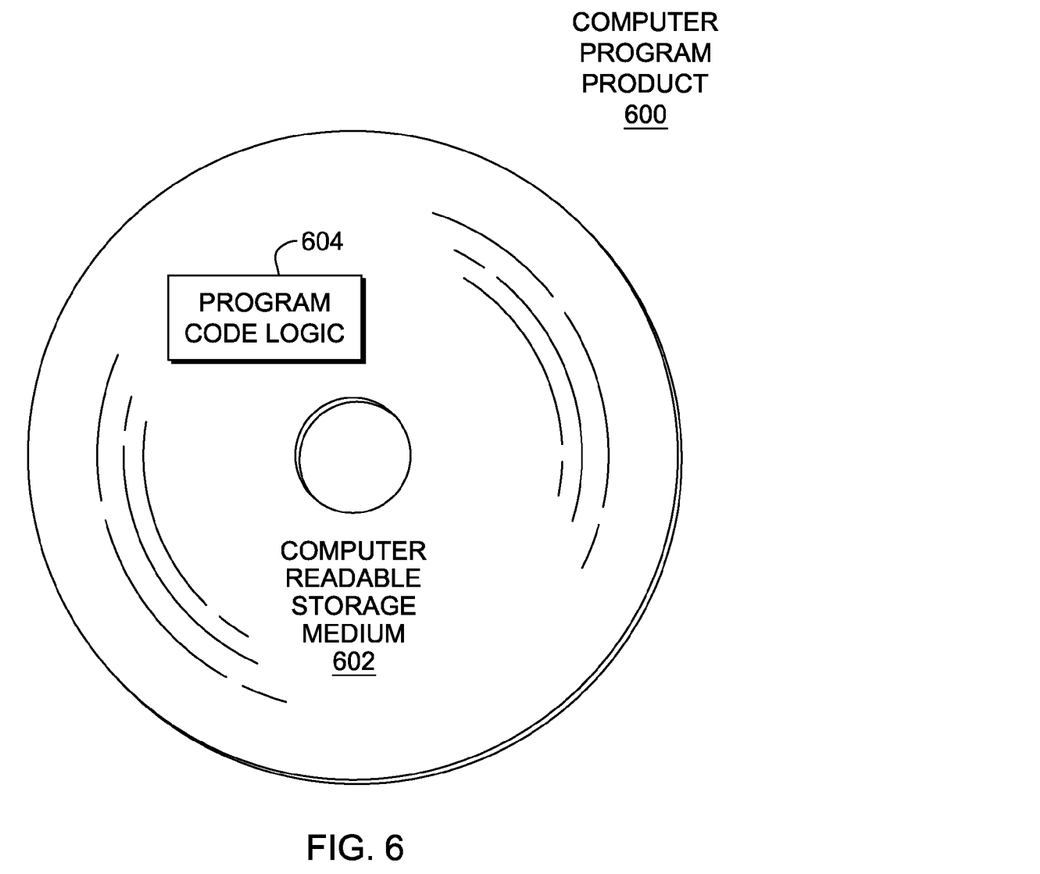
FIG. 6 depicts one embodiment of a computer program product to incorporate one or more aspects of the present invention.

Referring now to FIG. 6, in one example, a computer program product 600 includes, for instance, one or more non-transitory computer readable storage media 602 to store computer readable program code means or logic 604 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other types of processors and/or accelerators may be used, as well as other information to schedule/move the workload. Many variations may exist without departing from the spirit of one or more aspects of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for processing workloads within a computing environment, said computer program product comprising:

a non-transitory computer readable storage medium readable by a processing circuit and storing instructions for execution by the processing circuit for performing a method comprising:

selecting a workload to be processed within the computing environment, said workload having one or more workload characteristics associated therewith, and said computing environment comprising a hierarchy system including a plurality of processor hierarchies, wherein a processor hierarchy of the plurality of processor hierarchies includes one or more processors and has associated therewith one or more characteristics, wherein the one or more characteristics of the processor hierarchy includes at least one characteristic different from one or more characteristics of another processor hierarchy of the plurality of processor hierarchies;

assigning, during runtime, the workload to a processor of a processor hierarchy of the plurality of processor hierarchies, the workload to be executed by the processor, and wherein the assigning is based on at least one workload characteristic of the one or more workload characteristics of the workload to be processed and at least one characteristic of the one or more characteristics of the processor hierarchy with which the processor is associated;

determining whether execution of the workload will meet a defined criterion; and moving the workload from the processor to another processor of another processor hierarchy of the plurality of processor hierarchies, responsive to determining that execution of the workload will not meet the defined criterion, wherein the plurality of processor hierarchies progress from an inner processor hierarchy to one or more outer processor hierarchies, the inner processor hierarchy is closer to one or more core processors of the computing environment, and the another processor hierarchy to which the workload is moved is farther from the one or more core processors.

2. The computer program product of claim 1, wherein the assigning is further based on one or more processor characteristics of the one or more processors.

3. The computer program product of claim 1, wherein the assigning comprises:
determining whether a type of the workload is other than an unknown running time; and
choosing the processor based on one or more processor characteristics associated with the one or more processors, responsive to determining the type is other than unknown running time.

4. The computer program product of claim 3, wherein the assigning further comprises:
checking whether the workload throughput is known, responsive to determining the type of workload is unknown running time; and
choosing a processor in an outermost processor hierarchy of the plurality of processor hierarchies as the processor to execute the workload, responsive to the checking indicating the workload throughput is known.

5. The computer program product of claim 1, wherein the method further comprises:
initiating execution of the workload on the processor prior the determining.

6. The computer program product of claim 1, wherein the defined criterion comprises completion time of the workload.

7. The computer program product of claim 1, wherein the processor comprises an accelerator.

8. The computer program product of claim 1, wherein the one or more workload characteristics comprise at least one of type of workload, throughput and response time, and the one or more characteristics of the processor hierarchy comprise at least one of distance from a core processor of the computing environment and response time.

9. The computer program product of claim 1, wherein the computing environment includes one or more core processors, and wherein the assigning is performed, responsive to a request from a system separate from, but coupled to, the hierarchy system and the one or more core processors.

10. A computer system for processing workloads within a computing environment, said computer system comprising:
a memory; and
a processor in communications with the memory, wherein the computer system is configured to perform a method, said method comprising:
selecting a workload to be processed within the computing environment, said workload having one or more workload characteristics associated therewith, and said computing environment comprising a hierarchy system including a plurality of processor hierarchies, wherein a processor hierarchy of the plurality of processor hierarchies includes one or more processors and has associated therewith one or more characteristics, wherein the one or more characteristics of the processor hierarchy includes at least one characteristic different from one or more characteristics of another processor hierarchy of the plurality of processor hierarchies;

assigning, during runtime, the workload to a processor of a processor hierarchy of the plurality of processor hierarchies, the workload to be executed by the processor, and wherein the assigning is based on at least one workload characteristic of the one or more workload characteristics of the workload to be processed and at least one characteristic of the one or more characteristics of the processor hierarchy with which the processor is associated;

determining whether execution of the workload by the processor of the processor hierarchy of the plurality of processor hierarchies will meet a defined criterion; and moving the workload from the processor to another processor of the another processor hierarchy of the plurality of processor hierarchies, responsive to determining that execution of the workload will not meet the defined criterion, wherein the plurality processor hierarchies progress from an inner processor hierarchy to one or more outer processor hierarchies, the inner processor hierarchy is closer to one or more core processors of the computing environment, and the another processor hierarchy to which the workload is moved is farther from the one or more core processors.

11. The computer system of claim 10, wherein the assigning is further based on one or more processor characteristics of the one or more processors.

12. The computer system of claim 10, wherein the assigning comprises:
determining whether a type of the workload is other than an unknown running time; and
choosing the processor based on one or more processor characteristics associated with the one or more processors, responsive to determining the type is other than unknown running time.

13. The computer system of claim 12, wherein the assigning further comprises:
checking whether the workload throughput is known, responsive to determining the type of workload is unknown running time; and choosing a processor in an outermost processor hierarchy of the plurality of processor hierarchies as the processor to execute the workload, responsive to the checking indicating the workload throughput is known.

14. The computer system of claim 10, wherein the method further comprises:
   initiating execution of the workload on the processor prior to the determining.

15. The computer system of claim 10, wherein the defined criterion comprises completion time of the workload.

16. A method of processing workloads within a computing environment, said method comprising:
   selecting a workload to be processed within the computing environment, said workload having one or more workload characteristics associated therewith, and said computing environment comprising a hierarchy system including a plurality of processor hierarchies, wherein a processor hierarchy of the plurality of processor hierarchies includes one or more processors and has associated therewith one or more characteristics, wherein the one or more characteristics of the processor hierarchy includes at least one characteristic different from one or more characteristics of another processor hierarchy of the plurality of processor hierarchies;
   assigning, by a processor during runtime, the workload to a processor of a processor hierarchy of the plurality of processor hierarchies, the workload to be executed by the processor, and wherein the assigning is based on at least one workload characteristic of the one or more workload characteristics of the workload to be processed and at least one characteristic of the one or more characteristics of the processor hierarchy with which the processor is associated;
   determining whether execution of the workload by the processor of the processor hierarchy of the plurality of processor hierarchies will meet a defined criterion; and
   moving the workload from the processor to another processor of the another processor hierarchy of the plurality of processor hierarchies, responsive to determining that execution of the workload will not meet the defined criterion, wherein the plurality of processor hierarchies progress from an inner processor hierarchy to one or more outer processor hierarchies, the inner processor hierarchy is closer to one or more core processors of the computing environment, and the another processor hierarchy to which the workload is moved is farther from the one or more core processors.

17. The method of claim 16, further comprising:
   initiating execution of the workload on the processor prior to the determining.

* * * * *